Dec. 29, 1925.  
K. KIJIMA ET AL  
1,567,515  
AUTOMOBILE SHOCK ABSORBER  
Filed August 14, 1924
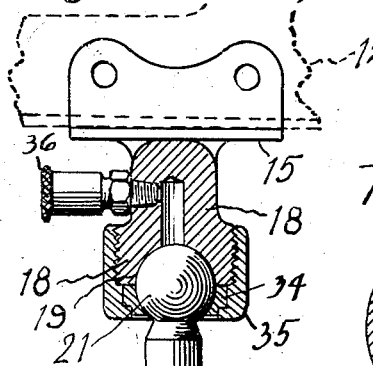
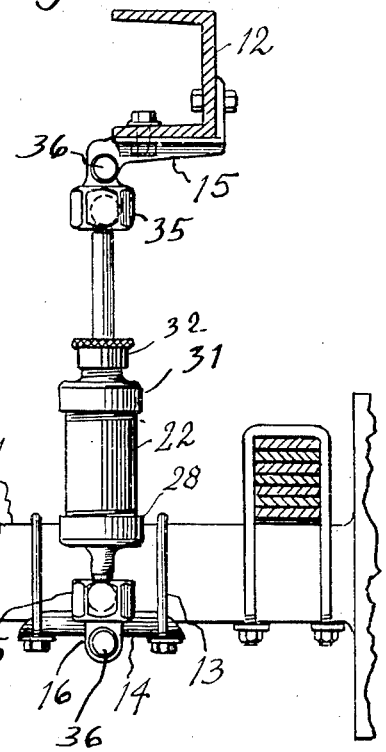
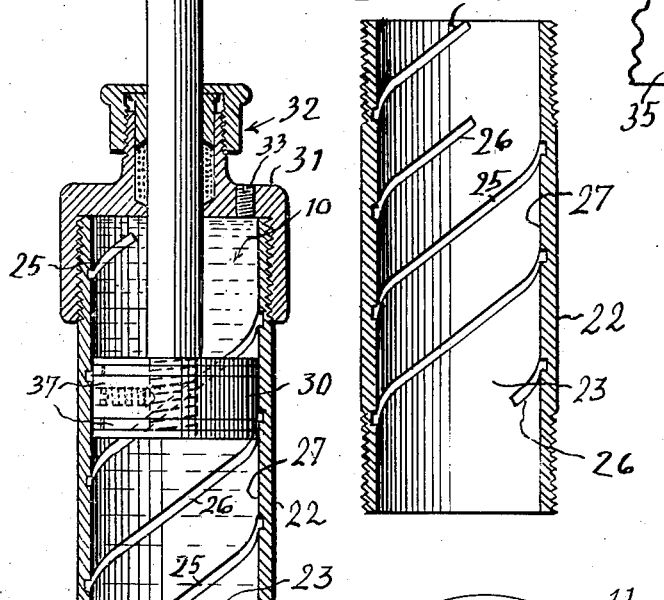
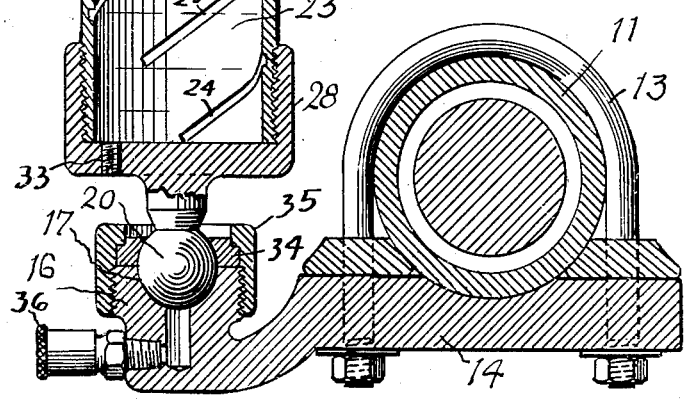
INVENTORS:  
Kenji Kijima.  
Masanao Ito.  
By Atty:  
Edward M. Kijima Patented Dec. 29, 1925.

1,567,515

UNITED STATES PATENT OFFICE.

KENJI KIJIMA AND MASANAO ITO, OF LOS ANGELES, CALIFORNIA.

AUTOMOBILE SHOCK ABSORBER.

Application filed August 14, 1924. Serial No. 732,048.

*To all whom it may concern:*

Be it known that we, KENJI KIJIMA and MASANAO ITO, subjects of the Emperor of Japan, residing in the city and county of Los Angeles and State of California, have jointly invented a new and useful Automobile Shock Absorber, of which the following is a specification.—

This invention relates to a shock absorber for automobiles, and its objects are to provide efficient means for checking the vibrations of the automobile body, to stop the dangerous and disagreeable tipping of the body on short turns and dangerous roads, to snub the rebound, to check the side sway, and to steady the steering of the vehicle.

While the drawings illustrate a preferred form of the invention, it is to be understood that minor changes and alterations may be resorted to without departing from the spirit of the invention or sacrificing any of its advantages.

In the drawings: Figure 1 is a sectional elevation of a shock absorber constructed in accordance with our invention. Fig. 2 is an end view of the body portion. Fig. 3 is a sectional elevation of the same. Fig. 4 is a side elevation of the device, showing the method of attaching same to the axle and frame of the automobile.

Referring to the drawings, the vehicle elements shown consist of the axle 11 and frame 12. Our invention consists of bracket elements 13 and 14, attached to the vehicle axle, and a bracket element 15 attached to the vehicle frame. The end 16, of bracket 14, is provided with a socket 17, and the end 18, of bracket 15, is provided with a similar socket 19. These are adapted to receive the respective ball members 20 and 21.

The body 22 forms a cylindrical chamber 23, adapted to contain a grease, or a heavy oil, or a similar substance 10, and is provided with internal spiral grooves 24, 25, and 26, on its inner wall 27. These spiral grooves serve as by-pass ways for the transmission of the contents of the cylindrical chamber from one end thereof to the other, on movement of the working elements within the cylinder. Cylinder head 28 is integral with ball member 20, and piston rod 29 is integral with ball member 21, and has mounted thereon the piston 30 having the piston rings 37. The cylinder head 31 is provided with a stuffing-box 32, and each cylinder head is provided with a service hold and a plug 33, therefor, whereby the contents of the cylinder chamber 23 may be replenished from time to time. The ball members 20 and 21, with their retaining elements 34 and 35, form ball and socket joints that allow a movement in any direction of the supporting brackets 14 and 15, and grease cups 36 furnish lubrication for these ball and socket connections.

From the description set forth it will be apparent that any movement of the vehicle body relative to the axle, will cause the piston 30 to work within cylinder body 22. The reciprocating motion of the piston is retarded and checked by the contents of the cylinder chamber. Such movement of the piston will cause a portion of the grease or oil to be transposed from one side of the piston to the other side thereof, through by-pass grooves 24, 25 and 26. It may be noted that groove 24 terminates at the upper extremity of the cylinder chamber; groove 25 terminates in a lower plane; and groove 26 terminates in a still lower plane from the top of the cylinder, and the opposite extremities of the grooves terminate in the same relative order. In the normal position of the working parts, the piston is so disposed that the space below the piston is double the space above.

It is apparent that, on movement of the piston from its normal position, a portion of the contents of the chamber will pass the piston through the three grooves, and that, after the initial movement of the piston to the terminal extremity of certain of the grooves, a smaller quantity of the contents will be transmitted or by-pass the piston, and on continued movement of the piston another transmitting groove will be cut off and still further check the movement of the piston, thus serving to check the movement of the vehicle body relative to the axle. The rebound movement is checked in a similar manner.

The device may be duplicated for application to either the front or the rear axle of the vehicle. The ball joints allow a universal movement in any direction and therefore the device will check any side swaying motion as well as the vibrations caused by the roughness of the street or road.

We claim:

1. In an automobile shock absorber, the combination with a cylinder connected for reciprocating movement relative to the automobile axle, and a piston working within the cylinder and connected for a reciprocating movement relative to the automobile frame, said cylinder having a series of spiral by-pass grooves in its inner wall and connecting the variable clearance chambers formed by the piston, of an hydraulic resistance medium within the cylinder capable of transmission through said by-pass grooves to equalize the pressure in said clearance chambers, the said grooves terminating in different planes to increase the corresponding chamber pressure as the piston approaches the limit of its reciprocating movement.

2. In a shock absorber for automobiles, a cylinder having its inner wall formed with a series of spiral grooves, a piston working within the cylinder, a piston rod extending from the cylinder and connected with the piston, ball and socket elements connecting the cylinder with the automobile axle, other ball and socket elements connecting the piston rod with the automobile frame, and an hydraulic resistance medium contained in the cylinder, and adapted to pass through said grooves upon movement of the piston, said spiral grooves serving to retard the flow of the medium from one end of the cylinder to the other upon movement of the piston.

In testimony whereof, we hereunto affix our signatures.

KENJI KIJIMA.
MASANAO ITO.